(12) United States Patent
Ng et al.

(10) Patent No.: US 6,923,559 B2
(45) Date of Patent: Aug. 2, 2005

(54) RADIATION-PATTERN-MATCHED LIGHT-DIFFUSING PATTERN FOR LIGHT GUIDE EDGE-ILLUMINATED BY A DIRECTIONAL LIGHT SOURCE

(75) Inventors: Kee Yean Ng, Prai Penang (MY); Yee Ling Tan, Perak (MY)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/427,337

(22) Filed: May 1, 2003

(65) Prior Publication Data

US 2004/0218376 A1 Nov. 4, 2004

(51) Int. Cl.[7] ................................................. F21V 5/00
(52) U.S. Cl. .................... 362/331; 362/26; 362/334; 362/551; 349/65; 385/129; 385/901
(58) Field of Search .................... 362/26, 334, 551, 362/31, 330, 331, 560, 561; 349/65; 385/129, 901

(56) References Cited

U.S. PATENT DOCUMENTS

| | | | | |
|---|---|---|---|---|
| 5,134,549 A | * | 7/1992 | Yokoyama | 362/31 |
| 5,394,308 A | * | 2/1995 | Watanabe et al. | 362/31 |
| 5,667,289 A | * | 9/1997 | Akahane et al. | 362/31 |
| 5,931,555 A | * | 8/1999 | Akahane et al. | 362/31 |
| 6,612,722 B2 | * | 9/2003 | Ryu et al. | 362/331 |

* cited by examiner

*Primary Examiner*—John Anthony Ward

(57) ABSTRACT

An apparatus for illumination comprises a light source operable to generate a radiation pattern. The apparatus further comprises a light guide adjacent the light source, which is operable to be illuminated by the radiation pattern. The light guide comprises a pattern of varying sized dots operable to diffusely reflect the illuminating radiation pattern. The dot pattern comprises monotonically increasing dot sizes intermediate between the smallest and the largest dot sizes, such that the smallest dot size is proximate to the light source and the largest dot size is distal from the light source.

16 Claims, 3 Drawing Sheets

RADIATION-PATTERN-MATCHED LIGHT-DIFFUSING PATTERN FOR LIGHT GUIDE EDGE-ILLUMINATED BY A DIRECTIONAL LIGHT SOURCE

TECHNICAL FIELD

This invention is related to light guide illumination technology, and particularly to radiation-pattern-matched light-diffusing patterns for light guides illuminated by directional light sources.

BACKGROUND OF THE INVENTION

FIG. 1 is a schematic representation of a common light guide design shown in side view 10 and in bottom view 11. Typically, the light source used in this case is cold cathode fluorescent lamp (CCFL) 100, placed at one edge of a plastic (for example acrylic) light guide 101. Light from light source 100 is incident into light guide 101 and is transmitted along light guide 101 through successive specular internal reflections. In order for light to exit from top surface 105, dots 103 are patterned on bottom surface 106 of light guide 101. When light is incident on a dot, for example dot 103, it is reflected in a diffuse manner and is then refracted out through top surface 105. To prevent light loss through bottom surface 106, white reflector layer 104 is applied to bottom surface 106. Similarly, to ensure that top surface 105 has luminance uniformity, diffuse translucent film 102 is applied to top layer 105.

The amount of light that is directed toward top surface 105 and the uniformity of luminance of top surface 105 are dependent on the pattern of dots 103 on bottom surface 106. An important parameter is the surface area of the dot, i.e., the dot size. A common design comprises a series of small dots near light source 100 that gradually increase in area proportionally with distance from light source 100. Therefore, the gradient of increase in surface area of the dots is in the x-direction shown by the coordinate axis in FIG. 1. As the light gets weaker, due to prior reflections as it propagates down light guide 101, the dot size is increased to ensure that the amount of light reflected from the dots still remains substantially the same. The dot pattern is thus configured such that the amount of light reflected from the dots is substantially the same along every incremental distance in the x-direction.

The dot pattern illustrated in FIG. 1 is particularly suitable for a light source such as a CCFL, in which light is emitted from all sides with fairly uniform intensity, i.e., omni-directional light intensity. FIG. 2 is a graphical representation showing the uniformity of the light, for example, in the x-direction. In this illustration, the lengths of arrows 200, which represent intensities in the x-direction, are generally uniform. As such, the design of the dot pattern is fairly straightforward. The dot area in the pattern has a uniformly increasing gradient from the end where the light source is located to the other extreme end.

BRIEF SUMMARY OF THE INVENTION

In accordance with an embodiment disclosed herein, a method for designing a light guide for use with a source generating a radiation pattern is provided. The method comprises: a) determining the generated radiation pattern; b) setting a largest dot size of the light guide; c) setting a smallest dot size of the light guide proximate to the source; d) setting an array of monotonically increasing dot sizes intermediate in size and location between the smallest and the largest dot sizes; and e) verifying that all dots in the array increase monotonically in size with distance from the source.

In accordance with another embodiment disclosed herein, an apparatus for illumination is provided. The apparatus comprises a light source operable to generate a radiation pattern. The apparatus further comprises a light guide adjacent the light source, which is operable to be illuminated by the radiation pattern. The light guide comprises a pattern of varying sized dots operable to diffusely reflect the illuminating radiation pattern. The dot pattern comprises monotonically increasing dot sizes intermediate between the smallest and the largest dot sizes, such that the smallest dot size is proximate to the light source and the largest dot size is distal from the light source.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

The light-diffusing dot pattern of an edge-illuminated light guide is optimally designed for the case of a directional light source, for example one or more light emitting diodes (LEDs). The light guide has an end surface where the directional light source is incident, a bottom surface where light is reflected, and a top surface where light is refracted as the light propagates inside the light guide, giving a uniform luminance appearance. The bottom surface contains a pattern of dots optimally designed to match the radiation characteristics of the directional light source. The size of any individual dot is dependent on the radiation pattern of the light source and the distance from the light source. The light is transmitted inside the light guide and directed up onto the top surface through diffuse reflection from an optimally designed dot pattern. This type of light guide is suitable for a directional light source such as an LED and is commonly used as backlighting for an LCD display.

Figure 3:
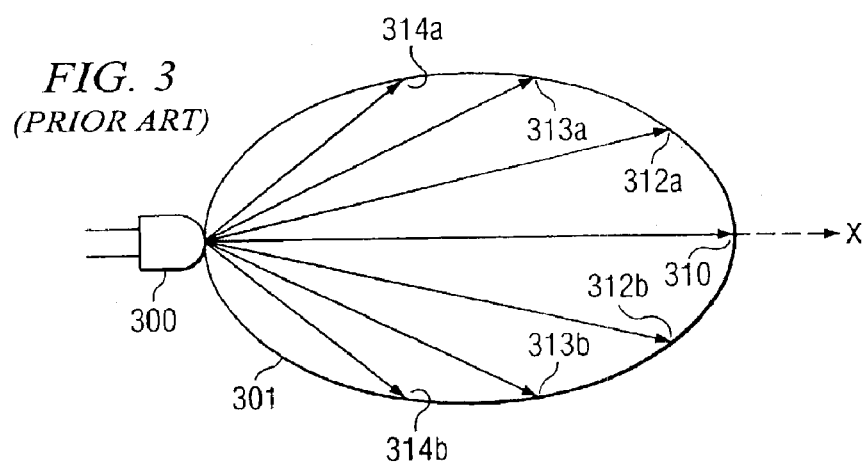
FIG. 3 is a schematic diagram representing a common LED radiation pattern.

Light sources based on solid state light emitting diodes (LEDs) are increasingly finding usage in backlighting applications as they get brighter with improvements in LED materials technology. A LED has a life span exceeding 100,000 hours, which is much longer than a CCFL. In addition, a LED can be driven at low voltages without drive inverters needed in the case of a CCFL. A LED is packaged in many forms and thus emits a variety of radiation patterns to suit different applications. However, in no cases do they exhibit an omni-directional radiation pattern. FIG. 3 is a schematic diagram representing a common LED radiation pattern. For example, for the case of lens-shaped LED package 300, the resultant emitted light is focused in a narrow directional radiation pattern 301. Radiation patterns of these devices are traditionally measured using a radiation pattern tester, which measures light intensity at different angular offsets from the mechanical axis of the LED package.

As depicted in FIG. 3, LED 300 can be regarded as a diverging point source of light. The intensity of emitted light pattern 301 is strongest along x-axis 310 of LED 300. However, depending on lens design, different radiation patterns can be obtained. For illustration purposes, simple radiation pattern 301 that has a maximum on the x-axis 310 is depicted. At other angles offset from x-axis, the light intensity drops off. Hence intensity at angle 310>intensity at angle 312a>intensity at angle 313a>intensity at angle 314a. For this case where the radiation pattern is symmetric, likewise intensity at angle 310>intensity at angle 312b>intensity at angle 313b>intensity at angle 314b.

Figure 1:
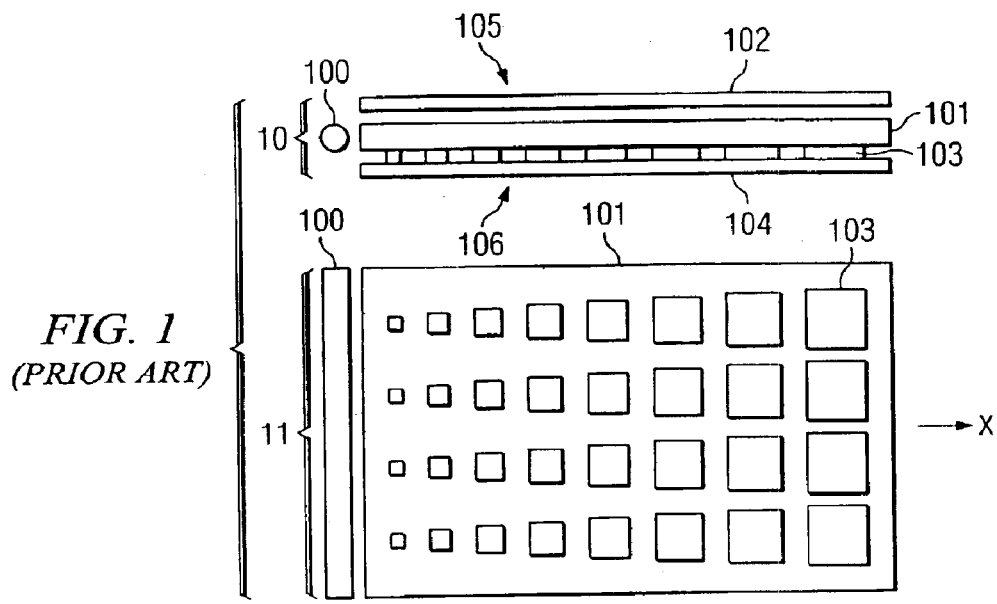
FIG. 1 is a schematic representation of a common light guide design.
Figure 2:
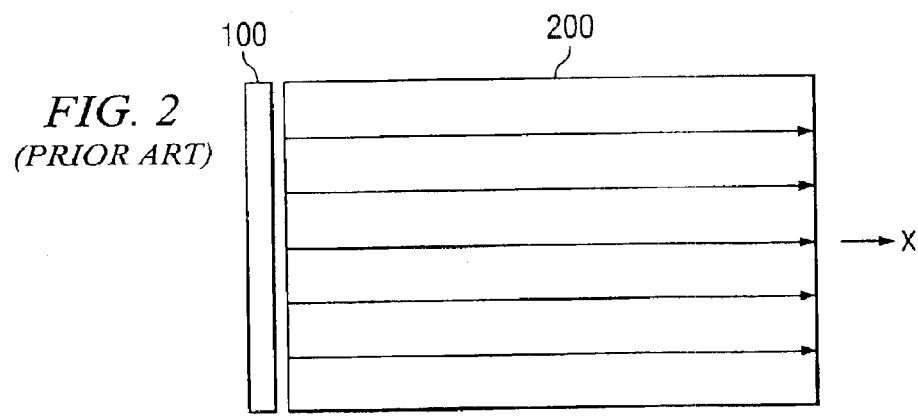
FIG. 2 is a graphical representation showing the uniformity of the light, for example, in the x-direction.
Figure 4A:
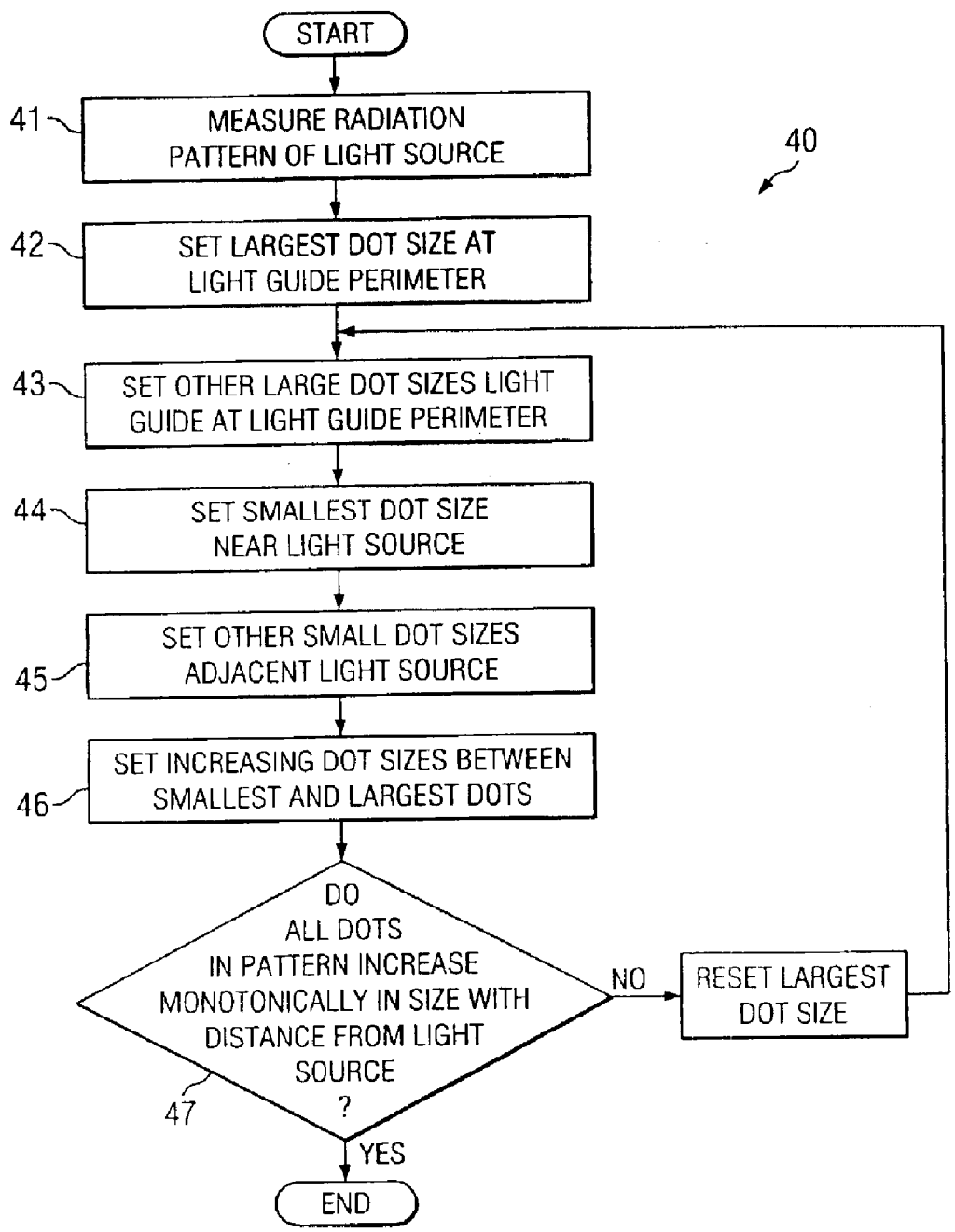
FIG. 4A is a flow diagram depicting a design procedure for designing an optimum light guide, in accordance with the disclosed embodiments.

In accordance with the disclosed embodiments, a methodology to design an optimum light guide is provided. FIG. 4A is a flow diagram depicting design procedure 40 for designing an optimum light guide, in accordance with the disclosed embodiments. At step 41, the radiation pattern of the LED or other light source is measured or otherwise determined. It is easily recognized that the radiation pattern of a directional light source, for example LED 300 or multiple LEDs, is different from that of CCFL 100 depicted in FIG. 2. LED 300 can be considered an approximate point source. Furthermore, the emitted light has different intensities at different angles. Therefore, the traditional dot pattern design as shown in FIG. 1 is not suitable, and accordingly the dot pattern must be designed differently.

Figure 4B:
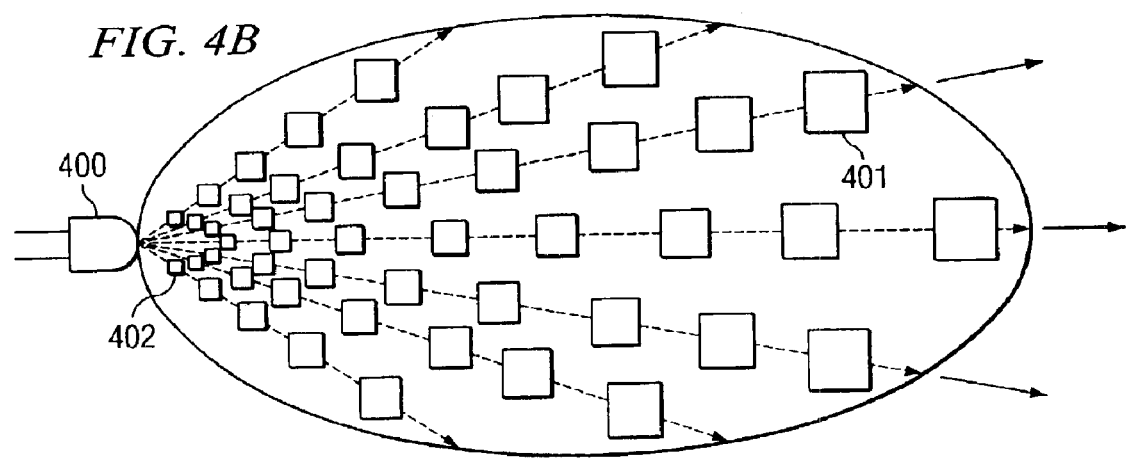
FIG. 4B is a schematic diagram representing a dot pattern of a light guide embodiment for a directional light source, designed in accordance with the design procedure depicted in FIG. 4A.

FIG. 4B is a schematic diagram representing a dot pattern of a light guide embodiment for a directional light source 400, designed in accordance with design procedure 40 depicted in FIG. 4A. At step 42 of design procedure 40, the size of dot 401 at the perimeter of light guide is determined. This is usually the largest dot size in the entire pattern of dots. At step 43, the other perimeter dot sizes, nearly the size of dot 401, are set. At step 44, the size of smallest dot 402 near light source 400 is then set. At step 45, other small dot sizes clustered near light source 400 are set. At step 46, between smallest dot 402 and largest dot 401 as determined above, an array of dots with gradually increasing sizes is then determined, as illustrated in the radial dot pattern of FIG. 4B. The dot size increases monotonically but not necessarily linearly with distance from light source 400 in the radial direction, matching the shape of the radiation pattern. In other words, the dot size is interpolated radially between smallest dot 402 and largest dot 401 with distance along radii centered at light source 400.

At step 47, if all dot sizes in the pattern are verified to increase monotonically with distance from light source 400, then design procedure 40 is complete. If all dot sizes in the pattern do not increase monotonically with distance from light source 400, then the largest dot size is reset, and the design procedure is repeated from step 43. The procedure is then iterated from step 43 through step 47, until all dot sizes in the pattern are verified to increase monotonically with distance from light source 400. In some variations of design procedure 40, steps 43 and 45 can be combined into step 46, namely setting an array of dots intermediate in size and location between largest dot 401 and smallest dot 402 and having dot sizes that increase monotonically with distance from light source 400.

Figure 5:
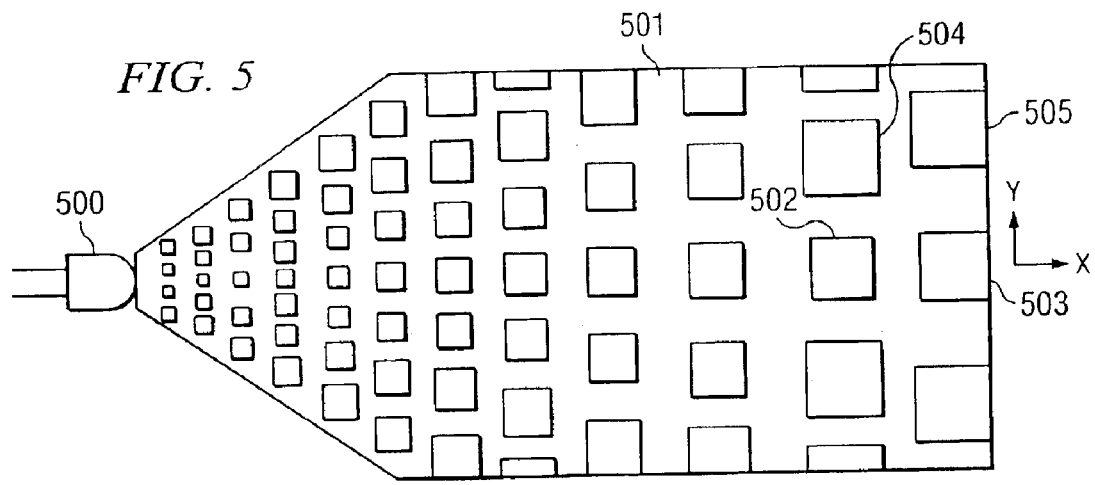
FIG. 5 is a schematic diagram representing a radiation-pattern-matched dot pattern design for a typical rectangular light guide.

The optimized pattern can alternatively be depicted as a series of dots with areas which increase in both the x and y directions. FIG. 5 is a schematic diagram representing a radiation-pattern-matched dot pattern design for a typical rectangular light guide. Usually the end of light guide 501 adjacent LED light source 500 is tapered, and this tapered portion of light guide 501 is not used for backlighting purposes. As can be seen, the sizes of the dots show a gradient increasing with distance from LED light source 500 in both the x and y directions. For example, dot 503 and dot 504 are both larger than dot 502. Likewise, dot 505 is larger than dot 503.

For ease of manufacturing, the dots can be any shape. Although square shapes are illustrated, round shapes, for example, can alternatively be used. Typically, a silk-screening or pad printing process patterns the dot, and a polymer-based white ink is used to increase the efficiency of light reflection.

The dots can also be fabricated integrally with the light guide, which is usually injection molded. The dot pattern can be machined into a metal mold as indentations or protrusions. When the light guide is injected molded, a corresponding indented or protruding feature will be obtained. Again, various shapes can be selected for the dots including, for example, cylindrical, hemispherical, polygonal, or pyramidal shapes.

Advantageously, the present methodology provides more uniform luminance from the top surface of a light guide with edge illumination by a directional light source.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for designing a light guide, comprising:
    a) determining a generated radiation pattern for a source, said source being considered an approximate point source;
    b) setting a largest dot size of said light guide;
    c) setting a smallest dot size of said light guide proximate to said source;
    d) setting an array of monotonically increasing dot sizes intermediate in size and location between said smallest and said largest dot sizes along a radius of said approximate point source; and
    e) verifying that all dots in said array increase monotonically in size with distance from said source.

2. The method of claim 1 comprising setting said largest dot size proximate to the perimeter of said light guide.

3. The method of claim 1 comprising setting said monotonically increasing dot sizes between said smallest and said largest dot sizes along orthogonal rectangular axes.

4. The method of claim 1 wherein said approximate point source generates a radiation pattern having a primary directionality with intensity decreasing radially from said primary directionality of said approximate point source.

5. The method of claim 4 wherein said source comprises at least one light emitting diode (LED).

6. The method of claim 1 further comprising:
    f) terminating said method of designing when all dots in said array are verified to increase monotonically in size with distance from said source, and otherwise repeating b) through e) of said method.

7. An apparatus for illumination, comprising:
    a light source operable to generate a directional radiation pattern, said directional radiation pattern having maximum intensity along a first radius directed from said source at a first angle and lower relative intensity along radii from said source angularly offset relative to said first radius;
    a light guide adjacent said light source, said light guide operable to be illuminated by said directional radiation pattern, said light guide comprising an array of varying sized dots operable to diffusely reflect said directional illuminating radiation pattern, said dot array comprising monotonically increasing dot sizes intermediate between said smallest and said largest dot sizes, said dot array pattern determined by said directional radiation pattern such that said smallest dot size is proximate to said light source and said largest dot size is distal from said light source.

8. The apparatus of claim 7 wherein said light source comprises at least one light emitting diode (LED).

9. The apparatus of claim 7 wherein said largest dot size is proximate to the perimeter of said light guide.

10. The apparatus of claim 7 wherein said monotonically increasing dot sizes between said smallest and said largest dot size are located along radii centered at said light source.

11. The apparatus of claim 7 wherein said monotonically increasing dot sizes between said smallest and said largest dot size are located along orthogonal rectangular axes.

12. The apparatus of claim 7 wherein said dots comprise a diffusely reflective coating material.

13. The apparatus of claim 12 wherein said diffusely reflective coating material comprises a polymer-based white ink.

14. The apparatus of claim 7 wherein said dots of varying size have shapes selected from the group consisting of cylindrical, hemispherical, polygonal, or pyramidal shapes.

15. The apparatus of claim 7 wherein said light guide is formed by injection molding.

16. The apparatus of claim 15 wherein said dots of varying size are injection molded integrally with said light guide.

* * * * *